(12) United States Patent
Nishikawa et al.

(10) Patent No.: US 6,804,888 B2
(45) Date of Patent: Oct. 19, 2004

(54) ROTATIONAL ANGLE DETECTOR AND ROTATIONAL ANGLE DETECTING METHOD

(75) Inventors: Hisashi Nishikawa, Shiga (JP); Yoshiyuki Nakade, Fukui (JP); Ichiro Tateishi, Fukui (JP); Masahide Onishi, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/294,866

(22) Filed: Nov. 14, 2002

(65) Prior Publication Data

US 2003/0088989 A1 May 15, 2003

(30) Foreign Application Priority Data

Nov. 15, 2001 (JP) ....................... 2001-349891

(51) Int. Cl.⁷ ............................... G01B 7/00
(52) U.S. Cl. ....................................... 33/1 PT
(58) Field of Search ............... 33/1 PT, 1 N, 33/534, DIG. 1, 706, 708

(56) References Cited

U.S. PATENT DOCUMENTS

| | | | |
|---|---|---|---|
| 5,065,324 A | * | 11/1991 | Oshita et al. ............... 33/1 PT |
| 5,446,966 A | * | 9/1995 | Ishizaki ....................... 33/1 PT |
| 5,930,905 A | | 8/1999 | Zabler et al. ............... 33/1 PT |
| 6,341,426 B1 | * | 1/2002 | Okumura .................... 33/1 PT |
| 6,507,188 B1 | * | 1/2003 | Dilger et al. ............... 33/1 PT |
| 6,550,150 B1 | * | 4/2003 | Shirai et al. .................. 33/290 |
| 6,604,293 B2 | * | 8/2003 | Hamada ...................... 33/290 |
| 6,622,388 B2 | * | 9/2003 | Meyer et al. ............... 33/1 PT |
| 6,671,972 B2 | * | 1/2004 | Mitterreiter et al. .......... 33/534 |
| 2003/0020461 A1 | | 1/2003 | Toshihiro et al. |

FOREIGN PATENT DOCUMENTS

JP        63-284064        11/1988

* cited by examiner

Primary Examiner—Christopher W. Fulton
(74) Attorney, Agent, or Firm—RatnerPrestia

(57) ABSTRACT

A rotational angle detector detects, with a detecting unit, a rotation of a rotary body rotating in cooperation with a steering wheel as a detection signal having a cyclic waveform that gradually increases or decreases in one cycle, calculates the detection signal as a rotational angle of the rotary body, and stores the detection signal. The rotational angle detector is used for detecting the rotational angle of a steering wheel of a car and allows the angle detection at a high solution in a simple structure.

14 Claims, 7 Drawing Sheets

ROTATIONAL ANGLE DETECTOR AND ROTATIONAL ANGLE DETECTING METHOD

FIELD OF THE INVENTION

The present invention relates to a rotational angle detector and a rotational angle detecting method that are used for detecting a rotational angle of a steering wheel of a car.

BACKGROUND OF THE INVENTION

Recently, functions of cars have been improved, and thus more cars have detected rotational angles of the steering wheels using various rotational angle detectors to perform various controls. Such a conventional rotational angle detector is described with reference to FIG. 8 and FIG. 9.

FIG. 8 is a perspective view of an essential part of the conventional rotational angle detector, and FIG. 9 is a voltage waveform chart. A central part of disk-like rotary body 1 has engaging part 1A engaging with an inserted steering shaft (not shown), and the outer periphery of it has a plurality of transparent holes 1B with a predetermined pitch. Photo-interrupters 2, 3 having vertically facing light emitting element and light receiving element are disposed so as to sandwich transparent holes 1B in rotary body 1. Photo-interrupters 2, 3 are held by holding member 4 at predetermined positions slightly deviated from transparent holes 1B so that detection signals having a predetermined phase difference are obtained from the rotation of rotary body 1. Wiring board 5 has a plurality of wiring patterns (not shown) on its both faces and has an electronic circuit (not shown) formed of a microcomputer or the like. The electronic circuit is connected to photo-interrupters 2, 3 and generates detection signal 6.

When a steering wheel is rotated in the structure discussed above, rotary body 1 is rotated and transmission of light through transparent holes 1B and cut-off of light are repeated. Detection signals 6, 7 having respective continuous cyclic square waveforms having the phase difference as shown in FIG. 9 are supplied from photo-interrupters 2, 3 to an electronic circuit. Here, photo-interrupter 2 outputs detection signal 6, and photo-interrupter 3 outputs detection signal 7.

A rotational angle of rotary body 1 is detected by counting the number of the waveforms of one of detection signals 6, 7. A rotational direction of rotary body 1 is detected based on the phase difference between respective waveforms of detection signals 6, 7. For example, when the waveform of detection signal 6 comes after the waveform of detection signal 7 the rotation is determined to be clockwise, and when the waveform of detection signal 6 comes before the waveform of detection signal 7 the rotation is determined counterclockwise.

In this structure, resolution is calculated as described below. When the pitch of transparent holes 1B of rotary body 1 is set at 6 degrees, widths of the holes are set at 3 degrees, and the phase difference between respective waveforms supplied from photo-interrupters 2, 3 is set to be ¼ cycle, for example, respective waveforms of detection signals 6, 7 have cycle of 6 degrees and are shifted in phase by ¼ cycle. Therefore, the rotational angle detector can detect a rotational angle with accuracy up to 6/4=1.5 degrees. In other words, the rotational angle detector has a resolution of 1.5 degrees.

Such a rotational angle detector detects a rotational angle using two sets of photo-interrupters 2, 3 and rotary body 1 having a plurality of transparent holes 1B. These components are complexly arranged and machined to increase the cost, decrease of the pitch and width of transparent holes 1B is limited, and therefore the angle detection with high resolution is difficult.

DISCLOSURE OF THE INVENTION

A rotational angle detector of the present invention detects, with a detecting unit, rotation of a rotary body as a detection signal having a continuous cyclic waveform that gradually increases or decreases in one cycle. The rotational angle detector is structured so that a controller calculates the detection signal as a rotational angle of the rotary body. A rotational angle detecting method of the present invention comprises the steps of:

A) detecting the rotation of the rotary body rotating in cooperation with a steering wheel as a detection signal having a continuous cyclic waveform: and B) calculating the detection signal as a rotational angle of the rotary body.

The detection signal comprises a waveform gradually increasing or a gradually decreasing in one cycle.

DESCRIPTION OF THE PREFERRED EMBODIMENT

Exemplary Embodiment 1

Figure 1:
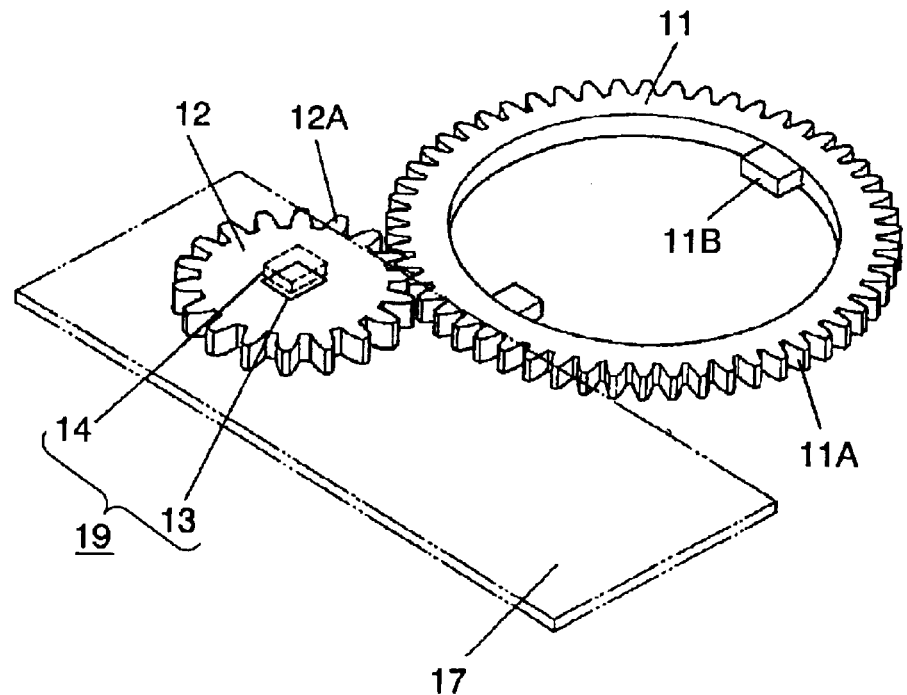
FIG. 1 is a perspective view of an essential part of a rotational angle detector in accordance with exemplary embodiment 1 of the present invention.
Figure 2:
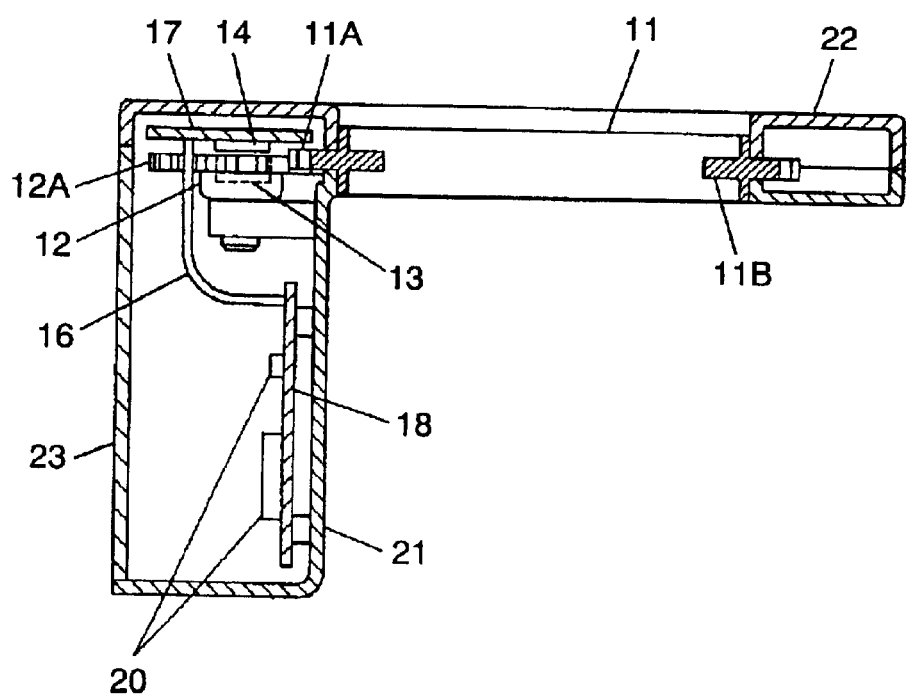
FIG. 2 is a sectional view of the rotational angle detector in accordance with exemplary embodiment 1.
Figure 3:
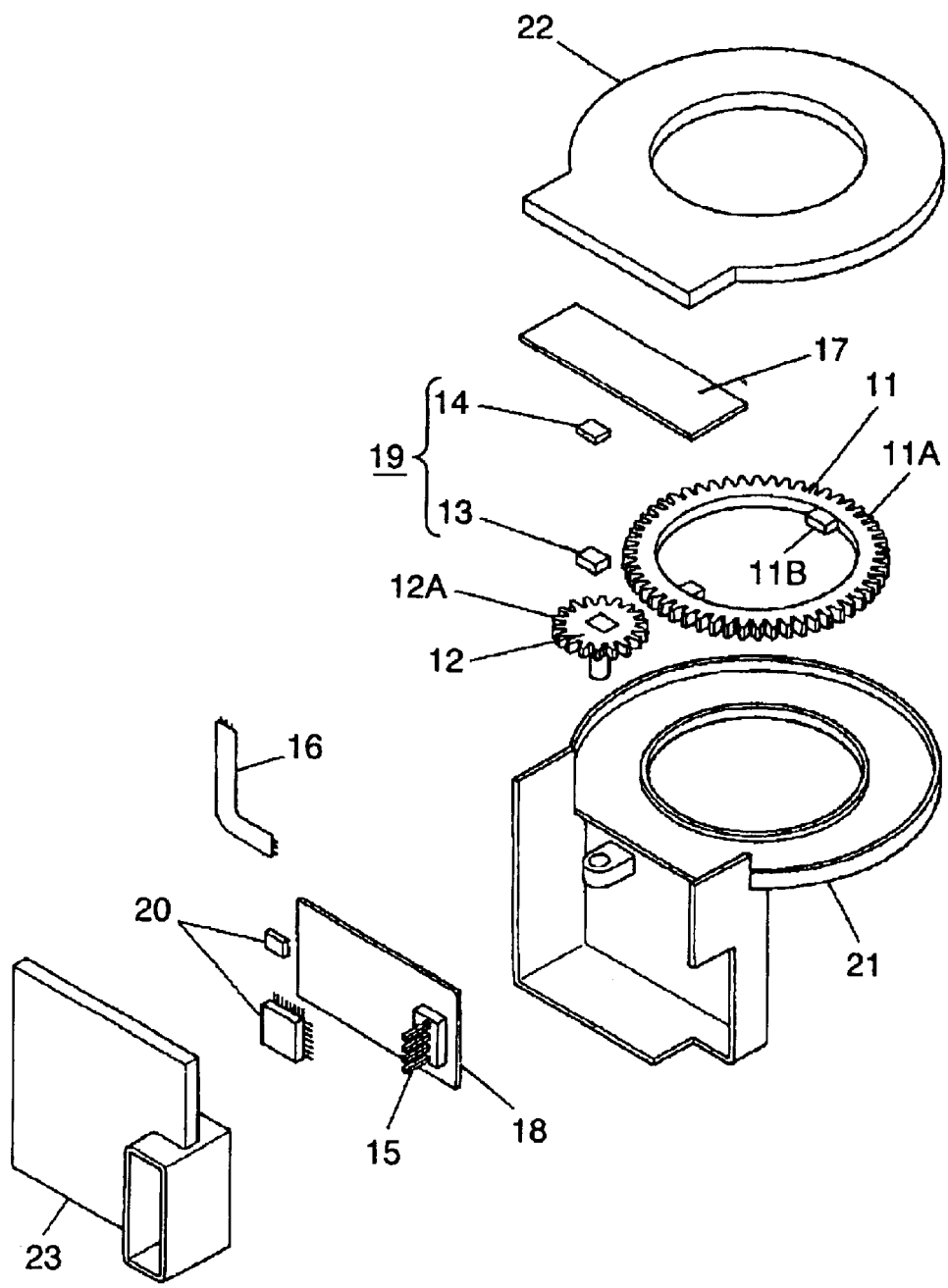
FIG. 3 is an exploded perspective view of the rotational angle detector in accordance with exemplary embodiment 1.

FIG. 1 is a perspective view of an essential part of a rotational angle detector in accordance with exemplary embodiment 1 of the present invention. FIG. 2 is a sectional view of the rotational angle detector. FIG. 3 is an exploded perspective view of the rotational angle detector. An inner periphery of rotary body 11 having spur gear 11A in its outer periphery is provided with engaging part 11B engaging with an inserted steering shaft (not shown).

Spur gear 12A in the outer periphery of detecting gear 12 meshes with spur gear 11A of rotary body 11, and magnet 13 is mounted to the center of detecting gear 12 by insert molding or the like.

Wiring board 17 disposed substantially in parallel with detecting gear 12 has a plurality of wiring patterns (not shown) on its both surfaces. A magnetic detecting element 14 such as an anisotropic magnetic resistance element (AMR element) is mounted on the facing surface of wiring board 17 to detecting gear 12. The mutually facing magnet 13 and magnetic detecting element 14 constitute detecting unit 19.

Wiring board 18 connected to wiring board 17 through lead wire 16 has controller 20 comprising a microcomputer or the like for processing a detection signal supplied from magnetic detecting element 14. Wiring board 18 is also connected to an electronic circuit (not shown) of a car body through connector 15.

Case 21 made of insulating resin and covers 22, 23 made of insulating resin cover rotary body 11, detecting gear 12, and wiring boards 17, 18, position them, and constitute a rotational angle detector.

Figure 4:
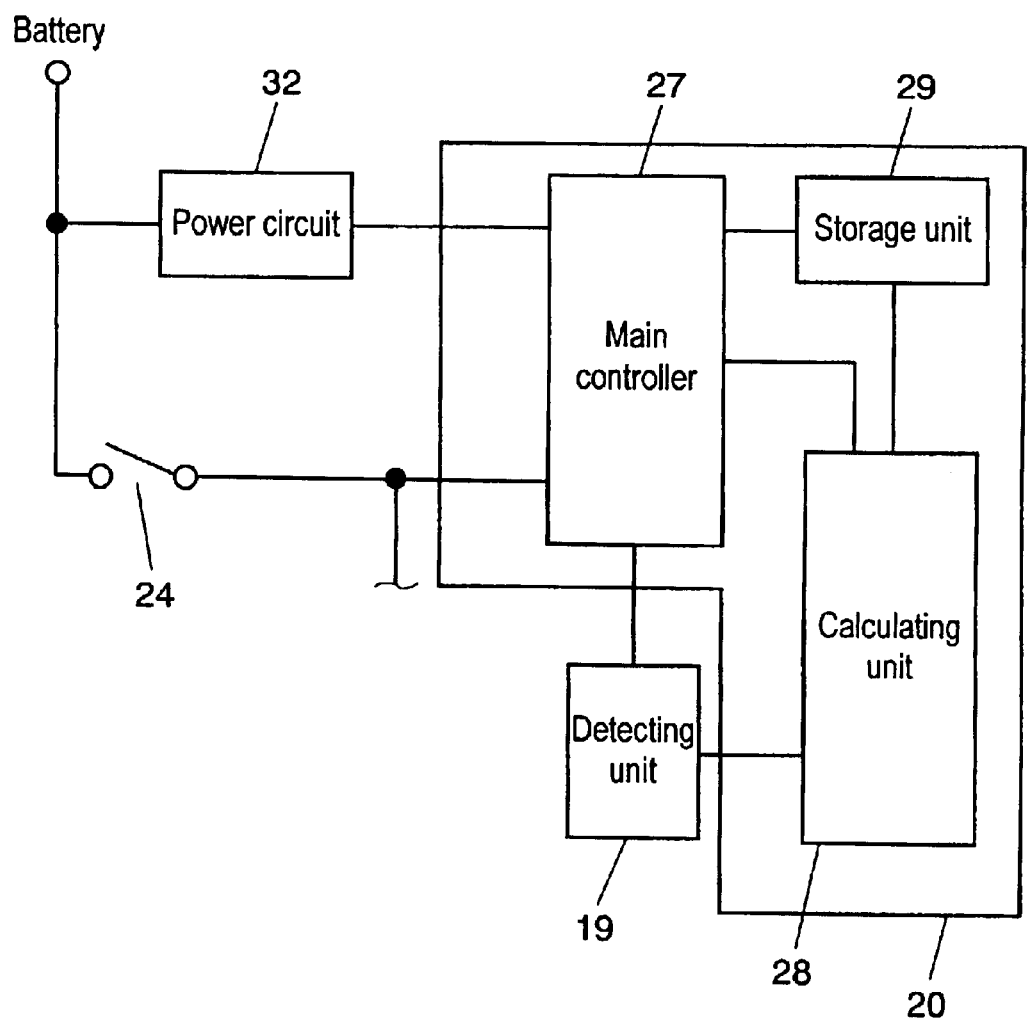
FIG. 4 is a block circuit diagram of the rotational angle detector in accordance with exemplary embodiment 1.

FIG. 4 is a block circuit diagram of the rotational angle detector. Detecting unit 19 formed of magnet 13 and magnetic detecting element 14 is connected to controller 20. Controller 20 comprises main controller 27, calculating unit 28 for calculating a detection signal supplied from detecting unit 19, and storage unit 29 for storing a calculated angle.

Power circuit 32 converts voltage of a battery from 12V to 5V, and applies the voltage. Ignition switch (IG switch) 24 switches the power supply for an electronic circuit or the like of the car body. Power is supplied from power circuit 32 to controller 20, and controller 27 is connected to IG switch 24.

When a steering wheel is rotated from the ON state of IG switch 24 in the structure discussed above, rotary body 11 rotates, and detecting gear 12 of which spur gear 12A meshes with spur gear 11A in the outer periphery of rotary body 11 also rotates.

The rotation of detecting gear 12 varies the magnetic-field direction of magnet 13 mounted to the center of detecting gear 12, and magnetic detecting element 14 detects change of magnetic force in response to the varying. Magnetic detecting element 14 of detecting unit 19 then outputs, to controller 20, a signal having a continuous cyclic waveform that gradually increases or decreases.

Figure 5:
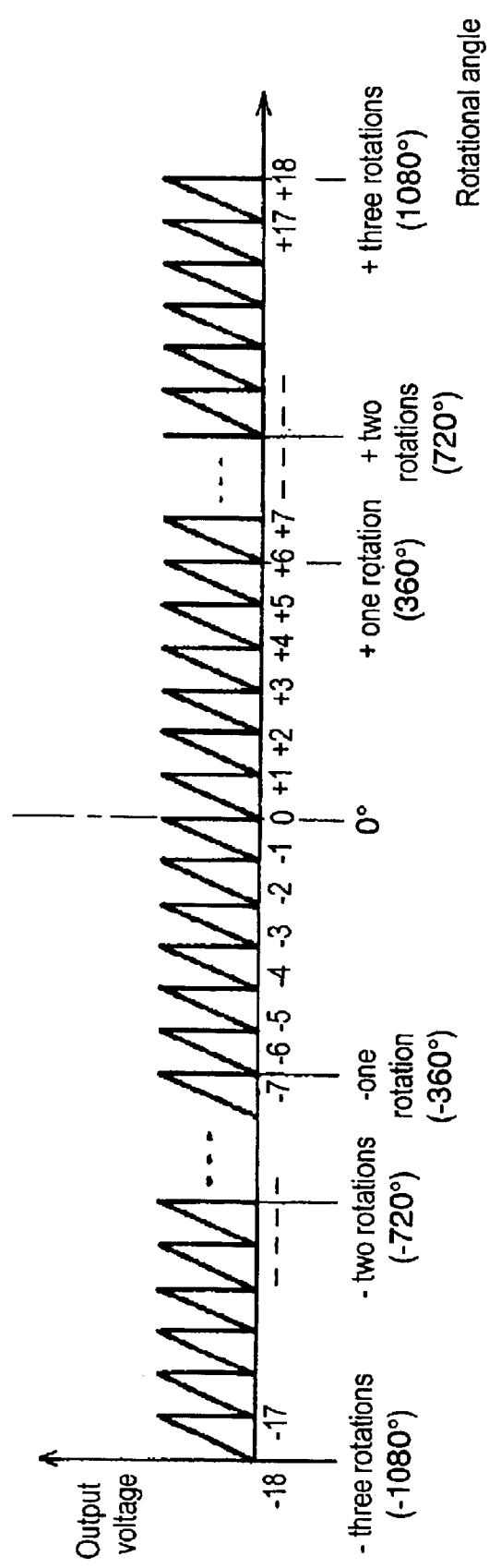
FIG. 5 is a voltage waveform chart of the rotational angle detector in accordance with exemplary embodiment 1.

At this time, for example, the number of teeth of detecting gear 12 is set to be ⅓ of the number of teeth of rotary body 11, and magnetic detecting element 14 detects only intensity of the magnetism. In other words, magnetic detecting element 14 detects the intensity every time detecting gear 12 rotates by 180 degrees. In this structure, detecting gear 12 rotates three times in one rotation of rotary body 11, and magnetic detecting element 14 detects the intensity twice in one rotation of detecting gear 12. Therefore, a voltage waveform having six cycles is continuously output as a detection signal. In other words, magnetic detecting element 14 outputs, as the detection signal, a cyclic voltage waveform that gradually increases or decreases to controller 20 every time rotary body 11 rotates by 60 degrees as shown in FIG. 5.

Calculating unit 28 of controller 20 counts a cycle number in a waveform of the detection signal from magnetic detecting element 14, detects an approximate rotational angle every 60-degree rotation of rotary body 11, and then detects an accurate rotation angle of rotary body 11 based on the voltage.

Figure 6A:
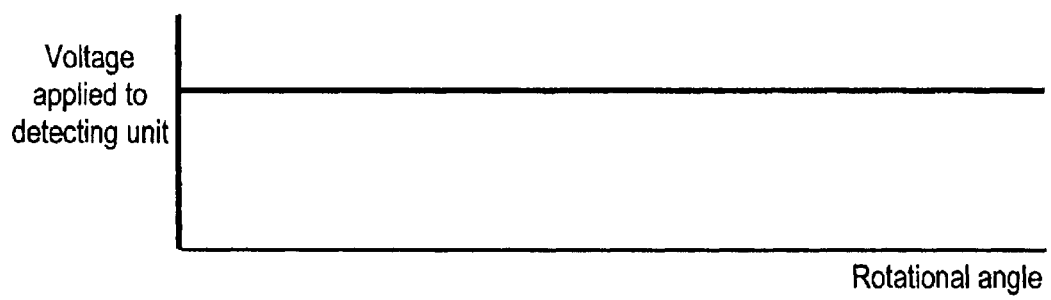
FIGS. 6A, 6B, and 6C are voltage waveform charts of the rotational angle detector in accordance with exemplary embodiment 1.
Figure 6B:
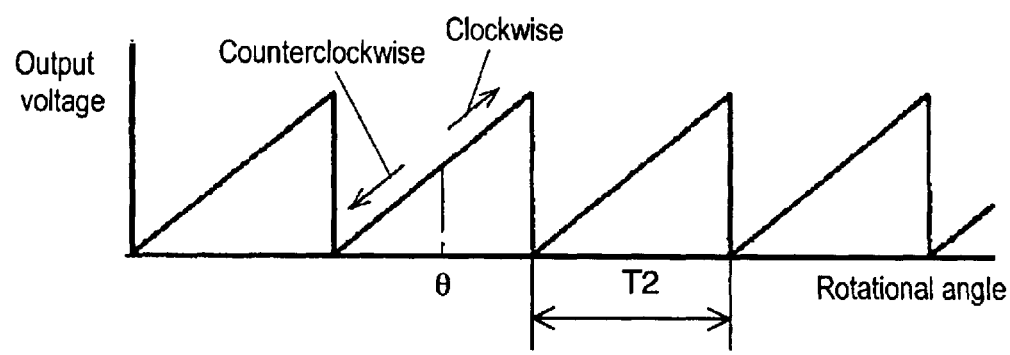

For example, in the voltage waveform diagram of FIG. 6B, a rotational angle θ corresponds to the second cycle with reference to 0 degrees in the waveform of the detection signal, so that controller 20 firstly detects that the rotational angle lies between 60 and 120 degrees. Controller 20 then detects an accurate angle of rotary body 11, for example 90 degrees, based on the corresponding voltage.

This voltage waveform is cyclic and gradually increases or decreases as discussed above. Controller 20 detects a rotational direction of rotary body 11, namely the steering wheel, based on the variation of the voltage. For example, the rotation is clockwise when the voltage increases, and the rotation is counterclockwise when the voltage decreases. The calculated angle is stored in storage unit 29.

When the steering wheel is rotated clockwise three times and counterclockwise three times, for example, storage unit 29 stores the cycle is number in the waveform, −18 to +18, in response to the rotational direction with respect to 0 degrees. Controller 20 then detects a rotational angle between −1080 and +1080 degrees as shown in FIG. 5.

This voltage waveform gradually increases or decreases every 60-degree rotation of rotary body 11. When calculation is performed using an analog/digital converter of 10 bits in the microcomputer of controller 20, the tenth power of 2 (two signals 0 and 1), namely 1024 is obtained. The detection of the rotational angle can be thus performed at a high resolution, namely about 0.06 degrees.

In embodiment 1, thus, detecting unit 19 detects the rotation of rotary body 11 as a signal having the continuous cyclic waveform that gradually increases or decreases in one cycle. Controller 20 calculates the detection signal as a rotational angle of rotary body 11 and stores the signal. This structure of the rotational angle detector allows one detecting unit 19 to detect a rotational angle. The rotational angle detector can detect an angle at a high resolution in the simple structure.

Detecting unit 19 comprises magnet 13 and magnetic detecting element 14, thereby allowing stable detection without contact and providing an inexpensive rotational angle detector in the simple structure.

When IG switch 24 is turned off to stop an engine, controller 20 intermittently controls power supply from a battery to detecting unit 19 or the like. Consumed current is decreased (a low current consumption state), thereby reducing exhaustion of the battery.

While IG switch 24 is in the ON state, current of about 50 mA flows to controller 20 or detecting unit 19, because a constant voltage is always applied (a steady state) in supplying power to detecting unit 19 as shown in FIG. 6A. While IG switch 24 is in the OFF state and thus the engine is stopping, usually, the power supply to them is not performed. Storage unit 29 of controller 20 must store the rotational angle of the steering wheel in stopping the engine. The steering wheel can be rotated after stopping the engine, so that main controller 27 detects the OFF state of IG switch 24 and power circuit 32 supplies power.

Figure 6C:
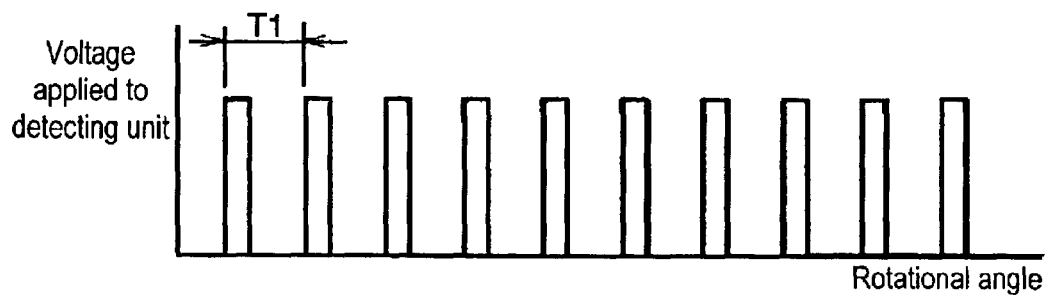

The battery is not recharged in the stopping state of the engine, so that main controller 27 intermittently supplies power from the battery to detecting unit 19 or the like as shown in the voltage waveform diagram of FIG. 6C. In this state, flowing current is about 1/100 of that in the steady state and is thus in a low current consumption state, thereby reducing the exhaustion of the battery.

When intermittent time T1 of the power supply is set less than time T2, the rotational angle can be also certainly detected even if the steering wheel is rotated at a high speed. The time T2 depends on the rotation speed of the steering wheel, namely rotary body 11, and corresponds to one cycle in the waveform of the detection signal shown in FIG. 6B.

Controller 20 switches the power supply between the steady state and the low current consumption state in response to the rotation speed of rotary body 11. For example, controller 20 detects speed of the variation of the rotational angle and returns the power supply to the steady state during high-speed rotation of the steering wheel. Thus, the detection of a rotational angle can be more certainly performed.

Exemplary Embodiment 2

Figure 7:
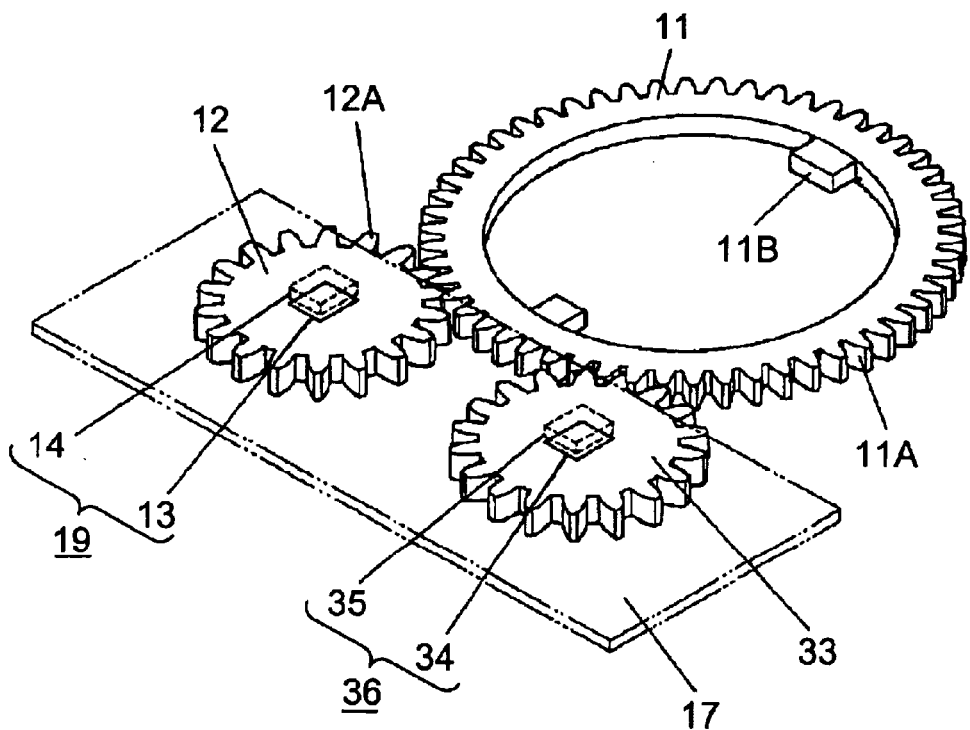
FIG. 7 is a perspective view of an essential part of a rotational angle detector in accordance with exemplary embodiment 2 of the present invention.
Figure 8:
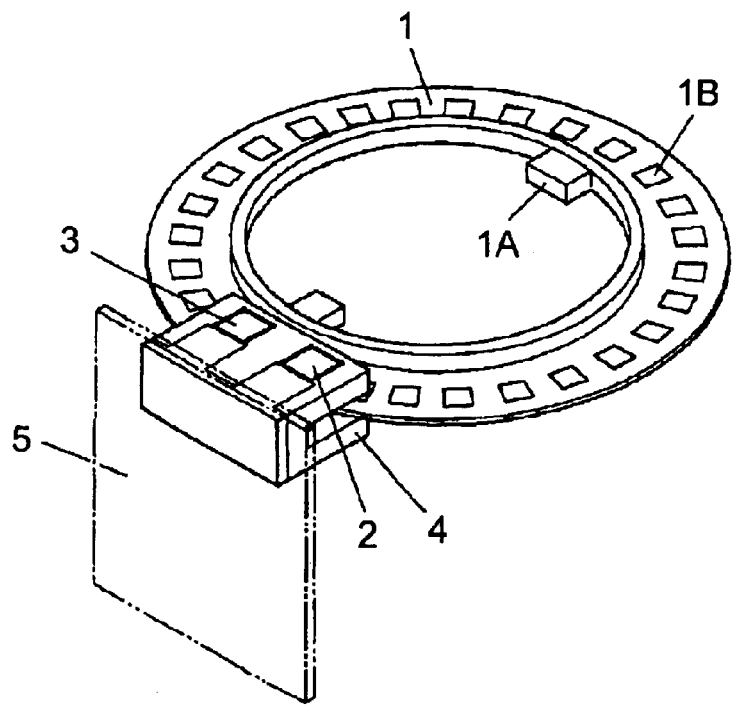
FIG. 8 is a perspective view of an essential part of a conventional rotational angle detector.
Figure 9:
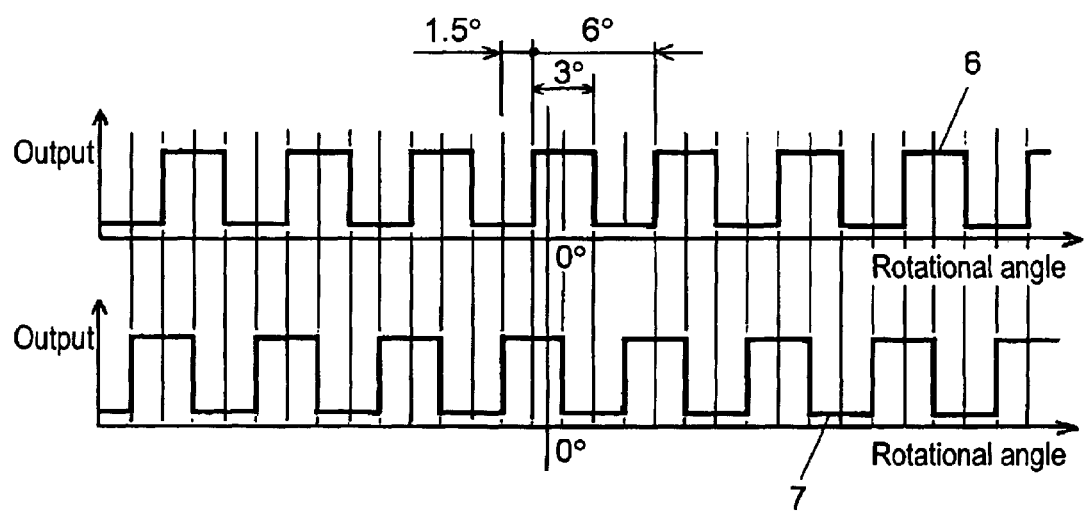
FIG. 9 is a voltage waveform chart of the conventional rotational angle detector.

A rotational angle detector in accordance with exemplary embodiment 2 is described with reference to FIG. 7. In embodiment 2, elements similar to those in embodiment 1 are denoted with the same reference numbers. FIG. 7 is a perspective view of an essential part of the rotational angle detector in accordance with exemplary embodiment 2. In addition to detecting unit 19 of embodiment 1, auxiliary gear 33 having the same number of teeth and the same shape as those of detecting gear 12 is meshed with spur gear 11A of rotary body 11. Magnet 34 mounted to the center of auxiliary gear 33 and magnetic detecting element 35 such as an AMR element mounted on wiring board 17 constitute detecting unit 36. Controller 20 detects detection signals from both detecting units 19, 36. Thus, when no detection signal is supplied from detecting unit 19 though a detection signal is supplied from detecting unit 36, for example, it can be detected that some failure occurs in detecting unit 19.

In other words, when detection signals supplied from detecting units 19, 36 are different from each other, a failure is detected to occur in some detecting unit, thereby allowing more certain detection of the rotational angle.

The structure in which spur gear 12A of detecting gear 12 is meshed with spur gear 11A in the outer periphery of rotary body 11 has been discussed above. However, a gear having the other shape such as a bevel gear may be used, or a recessed shape and a projecting shape other than the gears may be meshed with each other.

The structure has been discussed above in which detecting unit 19 comprises magnet 13 and magnetic detecting element 14 that are mounted to detecting gear 12. The other structure allowing the output of a gradually increasing or decreasing waveform may be employed. For example, slopes are formed on the upper and lower surfaces of detecting gear 12 and operate a variable resistor, and its resistance is detected.

In the present invention, a rotational angle detector allowing angle detection at a high resolution in a simple structure can be obtained.

What is claimed is:

1. A rotational angle detector for detecting rotational angle or a rotary body, said detector comprising:
    a detecting unit for detecting a rotation of said rotary body as a detection signal having a continuous cyclic waveform, said detection signal generated responsive to detection of a magnetic field from a magnet, the magnet and the rotary body rotating about respectively different axes; and
    a controller for calculating the detection signal as a rotational angle of said rotary body by counting a number of cycles of the detection signal,
    wherein the detection signal has a waveform which is either increasing in one cycle or decreasing in one cycle.

2. The rotational angle detector according to claim 1,
    wherein said controller calculates a rotational angle of said rotary body in one corresponding cycle based on the detection signal.

3. The rotational angle detector according to claim 1,
    wherein said detecting unit comprises a magnet and a magnetic detecting element.

4. The rotational angle detector according to claim 1,
    wherein said controller stores the rotational angle calculated based on the detection signal.

5. The rotational angle detector according to claim 1, wherein
    said controller is powered by a battery, and
    said controller intermittently controls power supply from the battery and detects a rotational angle of said rotary body in a low current consumption state.

6. The rotational angle detector according to claim 5,
    wherein an intermittent time of intermittent power supply from the battery is less than a time of one cycle of the detection signal.

7. The rotational angle detector according to claim 5,
    wherein said controller switches the power supply from the battery between a steady state and the low current consumption state in response to the rotation speed of said rotary body.

8. The rotational angle detector according to claim 1, wherein said detecting unit is one of a plurality of detecting units,
    wherein said controller compares detection signals supplied from said plurality of detecting units.

9. A rotational angle detector according to claim 1, wherein rotation of said magnet causes the detection signal to be either increasing in one cycle or decreasing in one cycle.

10. A rotational angle detecting method for detecting rotational angle of a rotary body, said method comprising the steps of:
    A) detecting a rotation of said rotary body by generating a detection signal responsive to detection of a magnetic field from a magnet which rotates about a different axis than said rotary body, said detection signal having a continuous cyclic waveform; and
    B) calculating the detection signal as a rotational angle of the rotary body by counting a number of cycles of the detection signal,
    wherein the detection signal has a waveform which is either increasing in one cycle or decreasing in one cycle.

11. The rotational angle detecting method according to claim 10,
    wherein the rotational angle of the rotary body is calculated in one corresponding cycle based on the detection signal in step B.

12. The rotational angle detecting method according to claim 10, further comprising a step of storing a calculation result in step B.

13. The rotational angle detecting method according to claim 10,
    wherein the rotation of the rotary body is detected as a plurality of detection signals and the plurality of detection signals are compared with each other in step A.

14. A rotational angle detecting method according to claim 10, wherein rotation of said magnet causes the detection signal to be either increasing in one cycle or decreasing in one cycle.

* * * * *

UNITED STATES PATENT AND TRADEMARK OFFICE
CERTIFICATE OF CORRECTION

PATENT NO. : 6,804,888 B2  Page 1 of 1
DATED : October 19, 2004
INVENTOR(S) : Hisashi Nishikawa et al.

It is certified that error appears in the above-identified patent and that said Letters Patent is hereby corrected as shown below:

Title page,
Item [56], References Cited, U.S. PATENT DOCUMENTS, "2003/0020461 A1 1/2003 Toshihiro et al" should read -- 2003/0020461 A1 1/2003 Nomura et al --

Column 5,
Line 48, "or" should read -- of --

Signed and Sealed this

Nineteenth Day of April, 2005

JON W. DUDAS
*Director of the United States Patent and Trademark Office*